Feb. 25, 1969      R. C. PARRISH      3,429,589
QUICK DISCONNECT COUPLING
Filed Sept. 20, 1965                  Sheet 1 of 2

INVENTOR.
REVEL C. PARRISH

Feb. 25, 1969   R. C. PARRISH   3,429,589
QUICK DISCONNECT COUPLING

INVENTOR.
REUEL C. PARRISH

# United States Patent Office 3,429,589
Patented Feb. 25, 1969

3,429,589
QUICK DISCONNECT COUPLING
Reuel C. Parrish, 3005 N. Enid Blvd.,
Enid, Okla. 73701
Filed Sept. 20, 1965, Ser. No. 488,492
U.S. Cl. 285—86
Int. Cl. F16l 37/18; F16j 15/10
13 Claims

ABSTRACT OF THE DISCLOSURE

A quick disconnect coupling assembly which includes a tubular body having an annular internal seat and handles pivotally connected to the outside of the body and each having a portion extending through an opening in the body and functioning upon pivotation of the handles to bias an adapter into sealing engagement with the internal seat. A tubular housing surrounds the tubular body and has apertures in the side thereof dimensioned to permit the handles to extend therethrough when they are pivoted to an adapter-releasing position. A locking device is provided for preventing relative axial movement between the body and housing while permitting relative concentric rotational movement between these elements. A spring assembly cooperates with the body and housing to bias the housing relative to the body in a rotational sense into a position where the handles are protectively covered by the housing.

---

The present invention relates to conduit couplings, and more particularly, but not by way of limitation, relates to improvements in conduit couplings of the type which can be quickly connected and disconnected.

Various types of fluid conduit couplings which can be quickly connected and disconnected by hand in high pressure service lines have been devised and are presently in extensive use. One type of coupling in widespread use employs a tubular female member, known in the art as a coupler, which has an annular resilient seat disposed within, and facing toward the open end of, the body of the coupler. A tubular male member, known in the art as an adapter, is received in the open end of the coupler, and has an annular seat formed on one end thereof and dimensioned to bear against, and mate with, the seat of the coupler. When the adapter is inserted in the coupler, the two seats are placed in juxtaposition to each other and, by means of a biasing handle member mounted on the coupler, the seat of the adapter may be biased into firm sealing contact with the seat in the coupler. In other words, when the coupler and adapter are operatively interlocked or engaged, the two seats are mated to form an annular, fluid-tight seal between the two tubular members. When the adapter and coupler are connected to the ends of two joints of conduit by any suitable conventional means, such as by threads a continuous, leak-proof fluid conduit is provided.

The adapter utilized in quick disconnect couplings may be forced into the coupler to firmly mate the two seats by any one of several types of mechanical advantage devices which usually comprises some type of lever or cam means. One of the most common types of cam means utilized for mechanically interconnecting the coupler and the adapter, as well as for urging the seat of the adapter into contact with the seat within the coupler, is comprised of one or more cams which are pivotally connected to the coupler and extend through the walls thereof to coact with an annular concave groove formed in the wall of the adapter. In this type of coupling device, the cam is pivotally connected directly to the body of the coupler and cams the adapter in an axial direction within the coupler body. The cam surface is connected to a handle which forms a lever to provide mechanical advantage in biasing the adapter seat into a tight seal with the seat formed within the coupler. One of the two seats, usually the seat formed within the coupler, is fabricated of a resilient material, and is compressed by the other of the seats when the adapter is forced axially into the coupler by pivotation of the handle.

The handles which are used to provide leverage in biasing the adapter into sealing engagement with the seat in the coupler through the cam means are generally elongated members which, in their connecting or engaging positions, extend in a generally axial direction along the body of the coupler. Although the contour of the cam means provided on the end of each handle is such that when the handle is moved to its fully connected position, the handle experiences no tendency to pivot outwardly or become disengaged, the protruding position of the handle nevertheless makes its subject to being struck or inadvertently hit by objects adjacent the coupling or adjacent the conduits which it interconnects so as to permit the coupler to become disengaged from the adapter. The use of handles and associated cam means disposed on opposite sides of the coupler body provides some margin of safety in that if one of the handles is inadvertently moved from its connecting position so as to accidentally release the cam means from one side of the coupler body, the other handle and its associated cam means remains sufficient to hold the adapter in sealing engagement with the seat within the coupling. There is some possibility, however, that both handles may be displaced from their coupling position and, in any event, it is desirable in some instances to provide the couplings with but a single handle and associated cam means.

The possibility of the coupling becoming accidentally disconnected to permit the fluid flowing through the coupling and the conduits which it interconnects to escape therefrom presents a serious safety hazard. For example, couplings of the type described are frequently utilized in high pressure service lines, some of which carry steam under pressure. The dangers to operating personnel from the untimely disconnection of the coupling to permit the high pressure fluid to escape from the coupling will be readily apparent.

The present invention provides an improved quick disconnect coupling assembly with the pivoted actuating handles of such couplings as hereinbefore described shielded or protected during the use of the coupling from accidental displacement to a releasing position so as to unlock or disconnect the coupling. Broadly described, the invention comprises a tubular body having an annular seat disposed coaxially inside the body; at least one handle pivotally connected to the tubular body between the ends thereof and having a portion extending through an opening in the tubular body and movable between a coupling release position and a coupling locking position as the handle is pivoted about its pivotal axis; a tubular housing surrounding the tubular coupling member and the actuating handle carried thereby, said tubular housing having at least one aperture in the side thereof of a size to permit one of the handles to be extended therethrough, and pivoted from a position extending radially outwardly from the tubular coupling member to a position extending generally parallel to the longitudinal axis of the tubular body.

The coupling assembly further includes locking means for interconnecting the tubular body and tubular housing with each other so as to prevent relative movement between the two elements in an axial direction, while permitting relative rotational movement between the two elements while they are in their concentric or coaxial relationship. Resilient actuating means is provided for resiliently biasing the tubular body in rotational movement about its longitudinal axis whereby said tubular body is moved by said resilient actuating means to a position in which the actuating handles are out of alignment with their respective openings in the tubular housing and are in a position to be protected by the tubular housing.

In a preferred embodiment of the invention, the concentric relationship of the tubular body and the tubular housing is maintained by an annular flange formed on one end of the tubular body and of larger diameter than the inside diameter of the surrounding tubular housing so as to prevent axial movement of the body in one direction through the housing. At the other end of the tubular body, a circumferential groove is formed in the inside wall of the tubular housing, and a retaining screw carried by the tubular body projects radially outwardly into the circumferential groove so as to prevent movement of the body in an axial direction within the housing.

The resilient actuating means which is utilized in the preferred construction of the invention comprises a compression spring which is positioned in the circumferential groove formed in the tubular housing. The compression spring bears at one of its ends against a screw or other member projecting radially inwardly into the circumferential groove from the tubular housing, and at its other end against the retaining screw hereinbefore described.

The length of the spring and its position are such that when it is substantially fully extended and in a relaxed status, the tubular body is rotated inside the tubular housing to a position such that the actuating handle or handles on the tubular body are out of alignment with the respective aperture or apertures in the tubular housing, and are shielded by the solid unapertured portions of the housing. To bring the actuating handles to a position where they are aligned with their respective apertures in the housing and accessible for manipulation therethrough, a positive act is required which will rotate the body in a direction relative to the housing which compresses the spring. Immediately upon releasing the body, it will be automatically pivoted within the housing by the spring so as to return it to its "safety" or protected position.

From the foregoing description of the invention, it will have become apparent that it is a major object of the invention to provide a quick disconnect coupling which includes structure preventing inadvertent or accidental disconnection of the coupling while in use.

A more specific object of the invention is to provide a quick disconnect coupling of the type having pivotally mounted handles functioning to connect and disconnect the coupling, and in which the handles are protected from unintentional contact with external forces when the coupling is connected and in operation.

Another object of the invention is to provide an improved quick disconnect coupling which is mechanically rugged and characterized in having a long and trouble-free operating life.

In addition to the foregoing described objects and advantages, additional objects and advantages will become apparent as the following detailed description of the invention is read in conjunction with the accompanying drawings which illustrate the invention.

Figure 1:
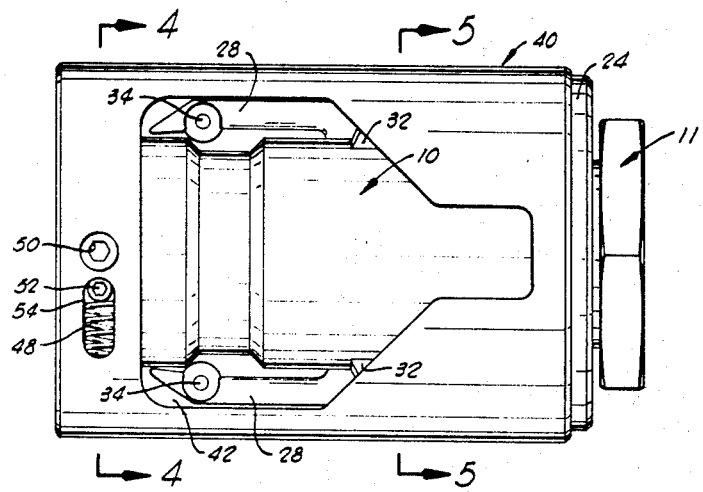
FIGURE 1 is an elevational view of the quick disconnect coupling assembly of the invention as the assembly appears when viewed from a side of the tubular housing having an opening therethrough to facilitate pivotation of the actuating handles of the coupling.
Figure 2:
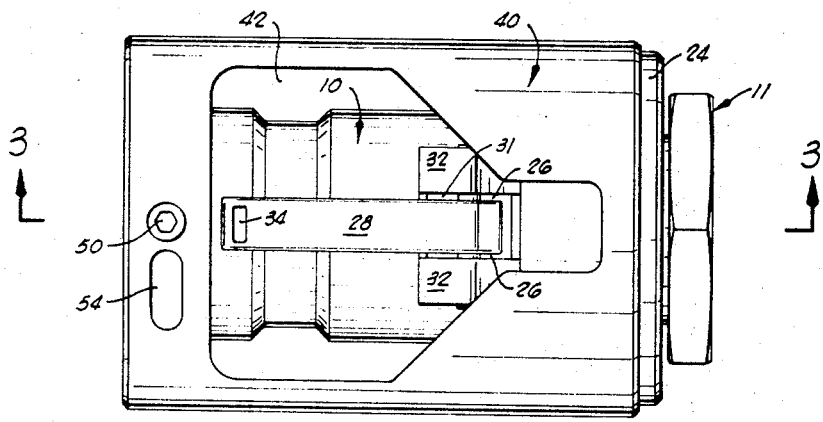
FIGURE 2 is a view in elevation similar to FIGURE 1, but illustrating the appearance of the quick disconnect coupling assembly when the tubular body constituting the male coupler has been rotated to a position in which the handles may be actuated to release the coupling.

The tubular body, which is termed the coupler or female member, of the conventional pivoted handle type coupling is designated generally by reference character 10. A tubular male member 11, termed the adapter, is positioned within the tubular body 10. The tubular body 10 has an internal thread 12 formed at one end thereof for connection to a conduit, hose or other tubular member which is to be connected through the coupling to a second conduit which is connectable to threads 13 formed internally in the adapter 11. The body 10 further includes a bore 14 and a counterbore 16 which is of larger diameter than the bore 14. At the intersection of the counterbore 16 and the bore 14, a circumferential or annular groove 18 is formed in the internal wall of the tubular body 10 and receives an annular seat 20 of resilient material.

The seat 20 faces toward an end portion 22 of the tubular body 10 of the coupler, and the end portion 22 carries an external, circumferential flange 24. Disposed between the seat 20 and the end portion 22 are a pair of diametrically opposed apertures 26 which are formed in the body 10 and accommodate an inwardly projecting portion of a pair of handles 28. The handles 28 carry at their ends which project through the opening 26, a cam surface 30 which is adapted to cooperate with a circumferential concave depression 29 formed in an adapter 11 so as to bias the adapter into seating engagement with the seat 20 in a manner well understood in the art. For a better understanding of this portion of the invention and the way in which the male adapter cooperates with the female coupler, reference is made to U.S. Patents 3,084,713 and 3,195,934.

Each of the handles 28 is connected to the body 10 of the coupler by pivot pins 31 which are extended through apertures in the handles and into a pair of ears 32 positioned on each side of the handles and formed integrally with, or otherwise suitably secured to, the body 10. At the ends of the handles 28 opposite the ends which carry the arcuate cam surfaces 30, each of the handles is provided with an aperture 34 through which can be passed a finger ring (not shown) to facilitate pivotation of the handles if desired.

Figure 3:
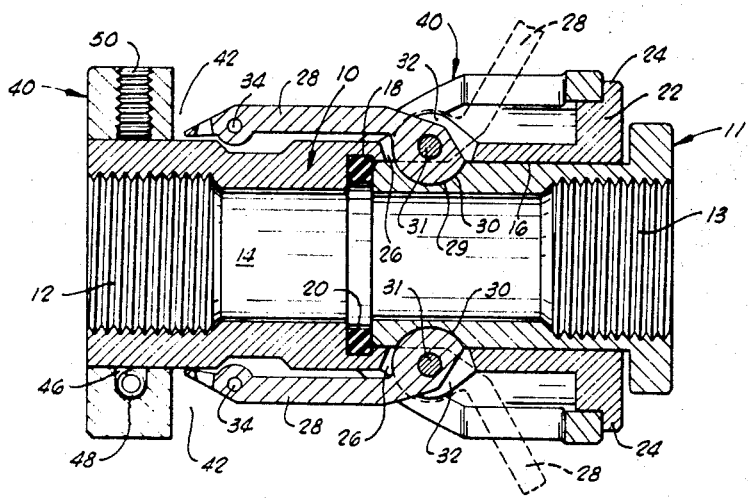
FIGURE 3 is a sectional view taken along line 3—3 of FIGURE 2.

Positioned concentrically around the tubular body 10 with a fit sufficiently loose to permit the tubular body to be rotated relative thereto is a tubular housing designated generally by reference character 40. The tubular housing 40 is provided with two relatively large, diametrically opposed apertures 42 formed in opposite sides thereof. The shape of these apertures 42 is such that each has a relatively large, generally rectangular base portion, a smaller elongated neck portion, and a trapezoidally shaped portion between the base portion and neck portion. In general, the apertures 42 are dimensioned to permit the handles 28 to be pivoted outwardly from a position in substantial parallelism to the axis of the tubular body 10 to a position extending generally outwardly from the body as shown in dashed lines in FIGURE 3. The length of the tubular housing 40 is such that when the flange 24 at the end 22 of the tubular body 10 bears against one end of the tubular housing 40, the ends of the tubular housing 40 and the tubular body 10 are flush with each other, as best illustrated in FIGURE 3.

Figure 4:
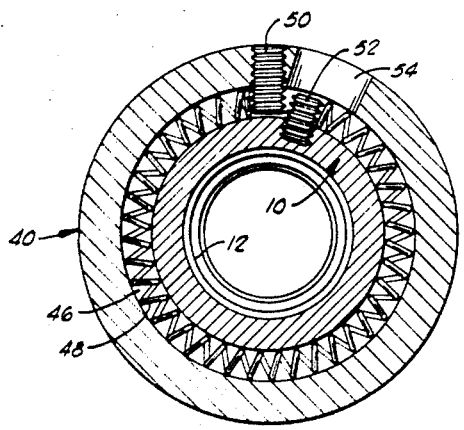
FIGURE 4 is a sectional view taken along line 4—4 of FIGURE 1.
Figure 5:
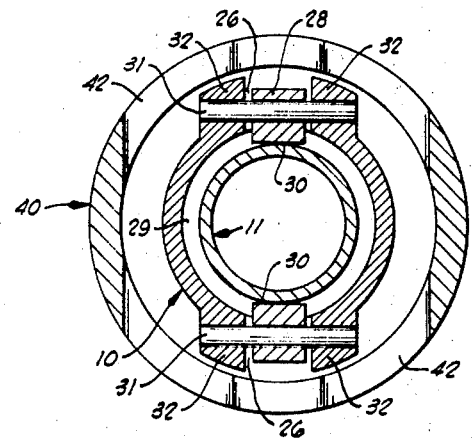
FIGURE 5 is a sectional view taken along line 5—5 of FIGURE 1.

At the end of the tubular housing 40 which is aligned with the end of the tubular body 10 carrying the internal threads 12, a circumferential groove 46 is formed in the housing. The groove 46 is preferably semi-circular in cross-sectional configuration and accommodates a compression spring 48 as illustrated in FIGURES 3 and 4. The compression spring 48 is of a length to extend substantially completely around the housing 40, and bears at one of its ends against a screw 50 or other suitable radially inwardly projecting stop member which is secured to, and moves with, the tubular housing 40. At its other end, the compression spring 48 bears against a screw 52 or other radially outwardly projecting stop member which is secured to the tubular body 10 and projects radially outwardly therefrom into the circumferential groove 46 formed in the tubular housing 40. An aperture 54 is formed in the tubular housing 40 in alignment with the circumferential groove 46 and is positioned so that the aperture 54 is aligned with the screw 52 when the spring 48 is fully extended and the tubular body 10 and tubular housing 40 occupy the relative positions illustrated in FIGURES 1 and 4.

*Operation*

In the operation of the quick disconnect coupling assembly of the invention, the helical spring 48 is first placed in the annular groove 46 formed in the internal wall of the tubular housing 40. One end of the spring is positioned to bear against the screw 50 which has been extended through the wall of the tubular housing into the annular groove 46. The other end of the spring is also permitted to bear against the screw 50 at this time during the assembly.

The tubular body 10 constituting the female coupler portion of the coupling is then positioned concentrically within the tubular housing 40 so that the flange 24 at the end of the tubular body bears against the end of the tubular housing. The threaded aperture in the tubular body 10 for receiving the screw 52 is brought into alignment with the aperture or slot 54 formed through the wall of the tubular housing 40 and a screw 52 can then be placed within the threaded screw receiving aperture. The helical spring 48 is compressed slightly so that instead of bearing against the screw 50 at both its ends, it now bears at one of its ends against the screw 52.

It will be noted that in this position of the tubular body 10 and the tubular housing 40, the handles 28 carried by the tubular body 10 are positioned behind the portions of the tubular housing which have not been cut away to form the apertures 42 therein. The spring in this status of the coupling is in its relaxed, fully extended condition.

Assuming that it is now desired to use the female coupler formed by the tubular body 10 to engage a male adapter 11 of the type hereinbefore described so that the adapter can be connected to one of two conduits to be interconnected, and the female coupler can be connected to the other conduit, the tubular body 10 is first rotated against the bias of the spring 48 in a counterclockwise direction so as to place the spring in compression, and bring the elongated handles 28 to a position in line with the apertures 42 in the tubular housing 40. With the handles 28 in this position, they may be grasped with the fingers and pulled outwardly so as to pivot them about the pivot pins 31.

When the handles 28 have been pivoted upwardly to the outwardly extending position illustrated in dashed lines in FIGURE 3, the cam surfaces 30 carried at the ends of the handles which are closest the respective pivot pins 31 are retracted toward the outside of the tubular body 10 so that the adapter 11 may be passed into the tubular body to a position where the concave circumferential groove 29 is aligned with the cam surfaces of the handles. At this time, the shank portions of the handles 28 are extended through the relatively narrow elongated neck portions of the apertures 42 in the tubular housing. This position of the handles 28 permits them to be released due to the fact that the biasing influence of the spring 48 is such that the frictional contact of the handles with the narrow neck portion of the apertures 42 will prevent the handles from falling back to their locking positions. The enlarged base portions of the apertures 42, on the other hand, permit the handles to be more easily reached with the fingers at the beginning of the pivotal movement from a locking position to a releasing position.

With the adapter 11 positioned within the tubular body 10, the handles 28 are then pivoted downwardly toward the tubular body 10 so that the cam surfaces 30 are brought into contact with the portions of the adapter which define the concave circumferential depression 29. Continued movement of the handles 28 toward their locking position in substantial parallelism to the axis of the tubular body 10 results in a part of the respective cam surface 30 being moved in an axial direction in the tubular body 10 and biasing the adapter 11 into contact at one of its ends with the annular seat 20. The final movement of the handles 28 to their locking position further biases the adapter 11 axially inwardly in the tubular body 10 so as to place the seat 20 in compression and form a tight seal between the adapter and the tubular body 10.

The coupling has now been engaged or interlocked, and can be permitted to return to its safety or protected position. This is done by releasing the tubular body 10 so that it is free to rotate relative to the tubular housing 40. The compression spring 48 then biases the tubular body 10 in rotative movement about the common axis of the body and the housing so that the spring becomes relaxed, and the screws 50 and 52 move into contact with each other and form a positive stop means limiting the rotative movement of the tubular body 10 within the tubular housing 40. It will be perceived in referring to FIGURE 1 that in this position of the coupling, the handles 28 are protected from inadvertent contact with external forces which might otherwise tend to release the handles and are, in fact, impossible to move upwardly without a rotative movement being applied to the tubular body 10 to bring the handles into alignment once again with the apertures 42 formed in the tubular housing.

From the foregoing description of the invention, it will have become apparent that the present invention provides an improved quick disconnect coupling which is safer to use than couplings of this type as they have been previously constructed. The coupling is mechanically rugged in its construction and is characterized by a long and trouble-free operating life.

Although a specific embodiment of the invention has been herein described as exemplary of one way in which the invention can be practiced, it is to be understood that structural modifications and changes in the relative arrangement of the several elements of the invention can be effected without any substantial departure from the basic principles upon which the invention is based. Changes and innovations of this type which continue to rely primarily upon the basic principles hereinbefore enunciated are deemed to be circumscribed by the spirit and scope of the invention except as the same may be necessarily limited by the appended claims or reasonable equivalents thereof.

What is claimed is:

1. In a quick disconnect coupling assembly of the type having a female coupler engaging a male adapter, the improvement comprising:
   a tubular body having a first end and a second end, and further having a seat therein and an opening therein between said seat and one of said ends;
   handle means movably connected to said body and extending through said opening and adapted to bias an adapter into contact with said seat, said handle means being movable from a first, releasing position in which said handle means projects outwardly from said body to a second, locking position in which said handle means is, as a whole, closer to said tubular body;
   a two-ended tubular housing concentrically and rotatably surrounding said tubular body and having an aperture formed in one side thereof of a size to permit said handle means to pivot therethrough from said second locking position to said first, releasing position;

means keying said tubular body to said tubular housing to prevent relative movement therebetween in an axial direction while maintaining said concentric relationship and permitting rotative movement between the body and housing; and resilient actuating means cooperating with said tubular body and said tubular housing and biasing said tubular body in rotation within said housing to a position in which said handle means is out of alignment with said aperture and is protected by a portion of said housing from which said aperture is absent.

2. The improvement in a quick disconnect coupling assembly as claimed in claim 1 wherein said handle means comprises:
an elongated handle pivotally connected to said body at a point adjacent said opening; and
cam means on the end of said handle closest its pivotal axis and extending through said opening.

3. The improvement in a quick disconnect coupling assembly as claimed in claim 1 wherein said means keying said tubular body to said tubular housing comprises:
a flange on one end of said tubular body bearing against one end of said tubular housing;
a projection extending radially outwardly from said tubular body at the end thereof opposite the end carrying said flange; and
projection engaging means on said tubular housing permitting rotative movement of said projection therein.

4. The improvement in a quick disconnect coupling assembly as claimed in claim 1 wherein said tubular housing has an arcuate groove formed coaxially therein and extending at least partially around the internal wall of said housing;
and wherein said resilient actuating means comprises a spring positioned in said groove and having one of its ends fixed with respect to said tubular body and its other end fixed with respect to said tubular housing whereby movement of said tubular housing and said tubular body relative to each other about a common rotational axis resiliently deforms said spring from its relaxed position.

5. The improvement in a quick disconnect coupling assembly as claimed in claim 2 wherein the aperture in one side of said tubular housing has an elongated neck portion of slightly larger width than said handle, a generally rectangular base portion of substantially larger width than said neck portion, and a trapezoidal portion between said neck portion and said base portion and aligned with the pivotal axis of said handle.

6. The improvement in a quick disconnect coupling assembly as claimed in claim 1 wherein said tubular body is provided with a second opening on the opposite side of said tubular body from said first mentioned opening; and said tubular housing is provided with a second aperture therein on the opposite side thereof from said first mentioned aperture; and further characterized to include second handle means movably connected to the opposite side of said tubular body from said first mentioned handle means and positioned for pivotation through said second aperture when said tubular body is rotated within said tubular housing.

7. The improvement in a quick disconnect coupling assembly as claimed in claim 6 wherein each of said handle means comprises:
a pair of circumferentially spaced ears on the outer peripheral surface of said tubular body adjacent each of said openings;
a pivot pin extending through said ears;
an elongated handle journaled on said pivot pin and having an end portion projecting through the respective opening; and
a cam surface formed on said end portion.

8. The improvement in a quick disconnect coupling assembly as claimed in claim 7 wherein said resilient actuating means comprises:
a spring positioned between said tubular body and said tubular housing; and
means on said tubular body and said tubular housing cooperating to compress the spring when said tubular body is rotated relative to said tubular housing.

9. The improvement in a quick disconnect coupling assembly as claimed in claim 8 wherein said means keying said tubular body to said tubular housing comprises:
an annular coaxial groove formed in one of the claimed tubular elements; and
a projection secured to and extending from the other of said claimed tubular elements into said annular groove.

10. A quick disconnect coupling comprising:
a tubular body having a first and a second end and having an annular seat therein facing one of the ends of said tubular body, and said tubular body having an opening formed through the wall thereof between said seat and the end of said tubular body which it faces;
a tubular male adapter positioned at least partially within said tubular body and having an end aligned with said seat and further having an annular concave depression extending around the external periphery thereof;
handle means movably connected to said tubular body and adapted to act through the opening in the wall thereof and cooperate with said tubular male adapter to bias said adapter into contact with said seat, said handle means being movable from a first, releasing position in which said handle projects outwardly from said body to a second, locking position in which said handle means is, as a whole, closer to said tubular body;
a two-ended tubular housing concentrically and rotatably surrounding said tubular body and having an aperture formed in one side thereof of a size to permit said handle means to pivot therethrough from said second, locking position to said first, releasing position;
means keying said tubular body to said tubular housing to prevent relative movement therebetween in an axial direction while maintaining said concentric relationship and permitting rotational movement between said tubular body and said tubular housing; and
resilient actuating means interconnecting said tubular body and said tubular housing and biasing said body in rotation within said housing to a position in which said handle means is out of alignment with said aperture and is protected by a portion of said housing from which said aperture is absent.

11. A quick disconnect coupling as claimed in claim 10 wherein said resilient actuating means comprises a spring cooperating with said tubular body and said tubular housing to undergo resilient deformation as said body and housing are rotated relatively to each other about a common pivotal axis.

12. A quick disconnect coupling as claimed in claim 10 wherein said handle means comprises an elongated handle pivotally connected to said tubular body for pivotation in a plane containing the axis of said tubular body and having an arcuate cam face extending through said opening.

13. A quick disconnect coupling as claimed in claim 10 wherein said keying means comprises:
a projection extending from and movable with said tubular body; and
groove means in said tubular housing receiving said projection.

(References on following page)

References Cited

UNITED STATES PATENTS

| | | | |
|---|---|---|---|
| 464,386 | 12/1891 | Patterson | 285—314 |
| 1,371,882 | 3/1921 | Ferguson et al. | 285—277 |
| 1,376,332 | 4/1921 | Gullick | 285—312 |
| 2,757,944 | 8/1956 | Krapp | 285—312 X |
| 2,889,157 | 6/1959 | Kolbe | 285—320 X |

THOMAS F. CALLAGHAN, *Primary Examiner.*

U.S. Cl. X.R.

285—312